3,324,095
POLYMERIZATION PROCESS
Wayne L. Carrick, East Brunswick, George L. Karapinka, Irvington, and Robert J. Turbett, Millington, N.J., assignors to Union Carbide Corporation, a corporation of New York
No Drawing. Filed May 14, 1965, Ser. No. 455,975
38 Claims. (Cl. 260—88.2)

This invention relates to an improved process for the polymerization of mono-olefins. More particularly, it relates to a new catalytic technique for the polymerization of ethylene and related olefins and to a new catalyst system therefor.

In application Ser. No. 455,941 entitled, "Olefin Polymerization Process and Catalyst Therefor," filed of even date herewith by one of us with L. M. Baker, and herein incorporated by reference, there is described and claimed a new process and a new catalyst system for olefin polymerization based on a new and different class of catalytic compounds hereinafter called silylchromates, characterized by the formula:

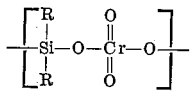

wherein R is a hydrocarbyl group having from 1 to about 14 carbon atoms. Such compounds, and particularly compounds such as bis-trihydrocarbylsilylchromates provide a catalytic system for the effective polymerization of olefins such as ethylene to high molecular weight, high density solid polymers. They suitably can be used by themselves, such as dissolved and in solution in an inert hydrocarbon or in liquefied monomer or they may be supported on an inert high-surface area solid such as silica or silica-alumina. If desired, these silylchromates can be promoted by reducing agents such as aluminum trialkyls or dialkyl aluminum halides to promote rapid polymerization at lower pressures and temperatures.

The polymers secured from this system in addition to having high molecular weights also are characterized by extremely low melt indices. For many applications, polymers of low melt index are not completely satisfactory, particularly in applications such as extrusion and injection molding which require considerably higher melt index in order to flow satisfactorily during the forming operation.

Inasmuch as the melt index is generally a function of the molecular weight of the polymer, it is therefore desirable, and in fact necessary in many situations, to find suitable techniques for the control of molecular weight. Prior to the present invention, this was only possible by temperature control during the polymerization or by post-polymerization treatment such as mild thermal cleaving or mechanical shearing. Both such treatments substantially increase production costs and handling of the polymer, providing economic disadvantages to the process.

According to the present invention, we have now found that effective molecular weight control can be secured by a particular catalytic additive to the catalyst system comprising a silylchromate compound as hereinafter specifically described.

The present invention resides in the discovery that by the addition to the system of a small amount of an organo aluminum compound having one or two oxyhydrocarbyl groups attached to the aluminum atom sufficient to reduce a portion of the silylchromate provides a catalytic system whereby effective control of the melt index of the polymers is now possible. The preferred organo aluminum compounds can be best represented by the formula $R_xAl(OR)_y$ in which $x$ and $y$ are integers from 1 to 2 inclusive and together total 3, and R is a hydrocarbyl group containing from 1 to about 14 carbon atoms. The R hydrocarbyl group is not critical and can be any selected hydrocarbon group such as alkyl, aralkyl, aryl, alkaryl, alicyclic, bi-cyclic and like hydrocarbons. Illustrative thereof are methyl, ethyl, propyl, iso-propyl, n-butyl, iso-butyl, n-pentyl, iso-pentyl, t-pentyl, hexyl, cyclohexyl, 2-methylpentyl, heptyl, octyl, 2-ethylhexyl, cyclohexylmethyl, nonyl, decyl, undecyl, dodecyl, tridecyl, tetradecyl, benzyl, pinyl, pinylmethyl, phenethyl, p-methylbenzyl, phenyl, tolyl, xylyl, naphthyl, ethylphenyl, methylnaphthyl, dimethylnaphthyl, norbornyl, norbornyl methyl or any such similar hydrocarbyl groups. Those R groups directly bonded to the aluminum atom containing from 1 to 8 carbon atoms are least expensive and most readily available of these compounds. Obviously the R groups can be the same or different.

The one or two oxyhydrocarbyl groups also attached to the aluminum atom are obtained preferably by direct interaction between the hydrocarbon alcohol or phenol corresponding to the desired oxyhydrocarbyl groups and an aluminum trihydrocarbon corresponding to the hydrocarbyl group desired in the compound. The interreaction is rapid and complete upon simple admixture of the stoichiometric amount of the alcohol. No catalyst or heating is required.

If desired, the oxyhydrocarbyl aluminum compounds can even be generated in situ in the system by the presence of a small but stoichometrically calculated amount of the desired alcohol with the trihydrocarbyl aluminum immediately prior to the polymerization as hereinafter shown.

While it is obviously contemplated from the above that aryl and hydrocarbon substituted aryl moieties can be present as the OR group of the aluminum compound, we would prefer to refer hereinafter to these compounds as "aluminum alkoxides" because of ease of nomenclature. Thus in all situations hereinafter, reference to the aluminum alkoxide is intended to include all of the above-identified materials coming within the scope of the above description.

Practically speaking, there are only several trihydrocarbyl aluminum compounds of significance commercially, although a larger number are available in small experimental quantities. Only triethyl aluminum, triisobutyl aluminum, and tri-n-propyl aluminum are of commercial use as to be available now in large amounts. Of these, the triethyl aluminum is preferred, although it should not be implied or assumed that for specific desired end results, other hydrocarbyl aluminum compounds may not be otherwise more desirable.

The oxyhydrocarbyl or alkoxide moiety of these compounds imparts a much greater effect in the process and in the control of polymer molecular weight than does the hydrocarbyl moiety. Depending on the size, nature and character of the alkoxide, different results can be expected. There is provided here, differing degrees of control of melt index by the particular section of the alkoxide cocatalyst. For example, diethylaluminum phenoxide is substantially more effective for producing higher melt index polyethylenes than is the diethylaluminum ethoxide and the diethylaluminum methoxide produces a lower melt index polymer. The diethylaluminum cyclohexanemethoxide even provides a lower melt index polymer of a much narrower molecular weight distribution of the polyme. This alkoxide is particularly preferred in a copolymerization of two or more olefins.

It has also been found that dialkyl aluminum monoalkoxides are more effective than are the dialkoxides in that higher rates of polymerization are thereby secured. Aluminum trialkoxides are so nearly insoluble as to be inoperative by themselves but when disproportionated with an aluminum alkyl into a monoalkoxide or a dialkoxide, they can be used as the source of the oxyhydrocarbyl compounds used herein. In like manner the dialkoxides can be disproportionated with aluminum alkyls into a mixture containing the monoalkoxide.

Thus it is seen that in this invention any desired combination of alkoxide and hydrocarbon groups attached to the aluminum atom is possible. Most particularly preferred of these compounds is the diethyl-aluminum ethoxide in that a very highly active catalyst is formed producing a higher melt index of polymer. This permits production of 1.0 melt index polyethylene even in a slurry process and provides a substantial economic advantage over other low pressure polymerization processes where other physical treatment of the polymer is necessary to obtain practically useful melt indices.

The amount of the aluminum alkoxide is not narrowly critical and need only be sufficient to reduce a portion of the silylchromate to the active catalytic form. Even amounts as low as about 0.2 mole of the aluminum alkoxide per mole of the silyl chromate can be used, although we prefer amounts greater than equimolar. Even more particularly, we prefer amounts from about 5 to 20 moles or more per mole of silylchromate. Little additional benefit is obtained in rate or yield by use of greater amounts but excess alkoxide is not harmful in the process.

The stlyl chromates employed herein are characterized by having a group of the formula:

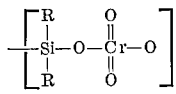

wherein R can be any hydrocarbyl group as previously defined having from 1 to about 14 carbon atoms. Among the preferred compounds containing said group are the bistrihydrocarbylsilylchromates of the formula:

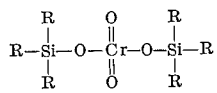

wherein R is any such defined hydrocarbyl group containing from 1 to about 14 carbon atoms, preferably from about 3 to about 10 carbon atoms. Illustrative thereof are methyl, ethyl, propyl, iso-propyl, n-butyl, iso-butyl, n-phenyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methyl-benzyl, phenyl, tolyl, xylyl, naphthyl, ethylphenyl, methylnaphthyl, dimethylnaphthyl, and the like. Illustrative of the preferred silylchromates but by no means exhaustive or complete of those which can be employed in this process are such compounds as;

Bis-trimethylsilylchromate
Bis-triethylsilylchromate,
Bis-tributylsilylchromate,
Bis-triisopentylsilylchromate,
Bis-tri-2-ethylhexylsilylchromate,
Bis-tridecylsilylchromate,
Bis-tri(tetradecyl)silylchromate,
Bis-tribenzylsilylchromate,
Bis-triphenethylsilylchromate,
Bis-triphenylsilylchromate,
Bis-tritolylsilylchromate,
Bis-trixylylsilylchromate,
Bis-trinaphthylsilylchromate,
Bis-triethylphenylsilylchromate,
Bis-trimethylnaphthylsilylchromate,
Polydiphenylsilylchromate,
Polydiethylsilylchromate,
and the like.

While both the aryl- and alkyl-substituted silylchromates can be used, it is to be noted that the aryl-silylchromates are more stable. The alkylsilylchromates, because of their instability and in some instances because they may be spontaneously explosive, should be handled with extreme caution, and preferably in solution or in an inert atmosphere or both.

The bis-triaromaticsilylchromates also have the advantageous property of being able to be handled in the presence of atmospheric moisture for periods up to several hours.

It is possible in this invention to conduct the olefin polymerization with the catalytic system of silylchromate-aluminum alkoxide dissolved in an inert solvent or to have them in a fine divided or dispersed phase in the organic solvent reaction medium. Similarly, they can be employed deposited on or adsorbed on an insoluble support in the same manner by the use of a finely divided insoluble inorganic material such as silica, alumina, silica-alumina mixtures and like inorganic materials of large surface area. It is by this latter embodiment of the invention that outstanding results are secured in polymerization rates and yields of polymer with this catalytic system without the need for catalyst separation or purification of the polymer to separate catalyst residues.

Preferably, when employed as a solid catalyst or when employed deposited or adsorbed on a solid insoluble support, there should be large surface areas for greatest contact of the catalyst with the monomer. Hence, it is highly advantageous that solid catalysts be finely divided, considering the desirability or possibility of later separation by filtration or other catalyst removal steps, if desired. Preferably, porous supports having large surface areas for the adsorption and/or deposition of the silylchromates such as in the order of 50 to 1000 square meters or more per gram are employed. This provides for greater ease of contact of the olefin monomer with the catalyst. Particle size of porous supports is not critical in this invention but can provide economic and materials handling benefits, depending upon the recovery techniques employed.

In this embodiment of the invention, it is highly desirable that the insert support be completely dried and freed of moisture and extraneous liquids before being contacted with the silylchromate. This is normally provided by a simple heating or pre-drying of the catalyst support with an inert gas prior to use herein. Surprisingly, however, it has been found that the temperature of drying has an appreciable effect on the productivity of the catalyst system and on the molecular weight distribution and the melt index of the polymer produced.

Drying or activation of the support can be accomplished at nearly any temperature up to about its sintering temperature for a period of time at least sufficient to remove the adsorbed water but avoiding that which will remove all of the chemically bound water. Desirably, an inert gas stream through the support during the drying aids in the displacement. Temperatures of from about 100° C. to 900° C. for a short period of about two hours or so should be sufficient if a well dried inert gas is used and the temperature not be permitted to get so high as to remove the chemically bound hydroxyl groups from the surface of the support. It is believed that these groups are responsible for the outstanding results secured with these supports since indications are that some interaction takes place between the silylchromate and the bound hydroxyl groups of the silica support so as to firmly anchor the silylchromate on the support.

Any grade of support can be used herein but the microspheroidal intermediate density (MSID) silica is preferred for the higher melt index resins. This grade has a surface area of 258 square meters per gram and a pore diameter of about 288 A., although the intermediate density (ID) silica having the same area but a pore diameter of 164 A. is as satisfactory. Other grades such as the G–968 silica and G–966 silica-alumina, as designated by the W. R. Grace and Co., having surface areas of 700 and 500 square meters per gram, respectively, and pore diameters of 50–70 A. are also quite satisfactory. Variations in melt index control and in polymer productivity can be expected between different grades of supports.

Without being bound by any particular theory herein, it is our belief that the aluminum alkoxide performs in some manner not only to reduce the silylchromate compound to a more effective catalytic site but also affects the chain length of the growing polymer chain to cause it to cleave from the catalytic site upon reaching a particular chain length, which is shorter than in the case using the aluminum trialkyl reducing agents alone. It is sometimes desirable to contact the silylchromate compound with the inert support prior to its contact with the aluminum alkoxide or any other promoter or catalytic material. This assures the proper control over molecular weight in accordance with the invention by having available sufficient alkoxide groups at the catalyst site after the silylchromate is firmly anchored on the support. After this, it is possible to also employ other reducing agents with the alkoxide, if desired, such as zinc dihydrocarbons or aluminum trihydrocarbons and particularly aluminum trialkyls. Thus, even mixtures of aluminum alkoxides and aluminum alkyls can be employed and still secure the benefits of this invention.

The use of the aluminum alkoxides alone as the reducing agent is most preferred in this invention in that polymers having the lowest intrinsic viscosity ($\eta$) at a given melt index or number average molecular weight are produced. This means that the molecular weight distribution of the polymer is narrower and is relatively free of higher molecular weight "tails" or fragments of extreme weight that will influence adversely the extrusion characteristics of the polymer.

However, the subsequent treatment of the supported silylchromate with a small amount of another promoter, such as an aluminum trihydrocarbon after the exposure to the aluminum alkoxide, or even conjointly with it, sometimes improves the polymerization rate and yield of polymer.

This improvement in rate and yield may well be due to the activity of the organo aluminum or organo zinc compound acting as a scavenger for impurities in the system since essentially equivalent rates and yields are secured when the aluminum alkoxides are used along with highly purified reagents. Such metal hydrocarbons as used for purposes of this invention whatever their real function may be, includes compounds of the formula $R_y MeX_z$ where R is a hydrocarbyl radical having from 1 to 14 carbon atoms, Me is an amphoteric metal such as aluminum or zinc, X is a halogen or hydrogen and $y$ is an integer from 2 to 3, inclusive and $z$ is an integer from 0 to 1, inclusive, the sum of $y$ and $z$ being equal to the valence of the metal Me. Preferred are the metal lower alkyls as exemplified by triethylaluminum, tri-isobutylaluminum, trioctyaluminum, dibutylaluminum bromide, diethylaluminum chloride, diethyl aluminum hydride, butylaluminum dichloride, zinc diethyl, zinc di-isopropyl, and the like. However, since their use is not an essential part of this process or in the catalyst system employed, the amount used is not critical. We use them generally in minor amounts compared to the aluminum alkoxide, i.e. from about 0.1 mole or so up to about 1 mole per mole per part of the alkoxide.

The polymerization reaction is carreid out at temperatures of from about 30° C. or less up to about 200° C. or more, depending to a great extent on the operating pressure, olefin monomer, the particular catalyst and its concentration. Naturally, the selected operating temperature is also dependent upon the desired polymer melt index since temperature is definitely a factor in adjusting the molecular weight of the polymer. Preferably the temperature is from about 30° C. to about 110° C. in the slurry or "particle forming" technique and from 100° C. to 200° C. in "solution forming." The control of tempertaure in this process is desirable as hereinafter more fully described in providing various effects upon molecular weight of the polymers as well as in controlling the phase in which they are made. As wtih most catalyst systems, the higher temperatures produce the lower weight average molecular weight polymers, and consequently of higher melt index. In fact by operating at the higher polymerization temperatures, polymers of a melt index of 100 to 1000 or more are possible and can be characterized as waxes, even though still of high density.

Regardless of whether the "particle forming" low temperatures or "solution forming" high temperatures are employed, a unique faculty of this catalyst system is the ability to carry out the polymerization to very high polymer solids, substantially higher than that obtainable with any other catalyst system without fouling of the equipment.

The pressure can be any pressure sufficient to initiate the polymerization of the monomer to high polymer and can be carried out from subatmospheric pressure, using an inert gas as diluent, to superatmospheric pressure up to about 1,000,000 p.s.i.g. or more, but the preferred pressure is from atmospheric up to about 1000 p.s.i.g. In the presence of a finely divided or large surface area support for the silylchromate to provide large surface contact of the catalyst with the monomer, pressures of 20 to 500 p.s.i.g. are preferred. However, as can be seen from the discussion and the appended examples, a wide latitude of pressures can be employed to secure the high polymers of the olefin.

The inert organic solvent medium when employed in this invention is not narrowly critical but it should be inert to the silylchromate catalyst and olefin polymer produced and stable at the reaction temperature used. It is not necessary, however, that the inert organic solvent medium serve also as a solvent for the catalyst composition or for the polymer produced. Among the inert organic solvents applicable for such purpose may be mentioned saturated aliphatic hydrocarbons, such as hexane, heptane, pentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene, and the like, and chlorinated hydrocarbons, such as chlorobenzene tetrachloroethylene, ortho-dichlorobenzene, and the like. Particularly preferred solvent media are cyclohexane, pentane, hexane, and heptane.

When it is desired to conduct the polymerization to a high solids level as hereinbefore set forth, it is of course desirable that the solvent be liquid at the reaction temperature. For example, operating at a temperature less than the solution temperature of the polymer in the solvent, the process can be essentially a slurry or suspension polymerization process in which the polymer actually precipitates out of the liquid reaction medium and in which the silylchromate catalyst is dissolved, or suspended as finely divided mass of itself or on an insoluble support as hereinbefore set forth.

This slurry system is of course dependent upon the particular solvent employed in the polymerization and its solution temperature of the polymer prepared. Consequently, in our "particle form" embodiment, it is most desirable to operate at a temperature less than the normal solution temperature of that polymer in the selected solvent. As for example, polyethylene prepared herein has a solution temperature in cyclohexane of about 90° C. and whereas in pentane its solution temperature is about 110° C. It is characteristic of this "particle form" polymerization system that the high polymer solids content is possible even at low temperatures provided agitation is present to enable adequate mixing of the monomer with the polymerizing mass. It appears that while the polymerization rate may be slightly slower at the lower temperatures, the monomer is more soluble in the solvent medium thus counteracting any tendency to low rates and/or low yields.

It is also characteristic that the monomer appears to have substantial solubility characteristics even in the solids portion of the slurry so that as long as agitation is provided and polymerization temperature maintained, a broad range of size of solid particles in the slurry can be provided. It has been our experience that the slurry technique can produce better than a fifty percent solids system, provided sufficient fluidizing conditions and agitation is maintained. We most particularly prefer to operate the slurry process in the range of 30–40 weight percent of polymer solids.

Further a substantial feature of this process is the complete absence of the so-called "ivory" or high polymer build up on the walls and agitators of the polymerization unit, a problem characteristic of many other polymerization techniques.

Recovery of the polymer from the solvent medium is in this embodiment simplified to a simple filtration and drying operation and no efforts need be expended in polymer clean up and catalyst separation or purification. The residual concentration of catalyst in the polymer is so small, that generally less than two to three parts of chromium per million parts of polymer can be achieved, and at such levels they are innocuous and unnoticed in the polymer. Expeditiously, they can be left in the polymer.

Operating at temperatures higher than the solution temperature of the polymer in the selected solvent medium also can produce a high polymer solids content in solution. The temperature in this embodiment must be sufficiently high to enable the solvent being used to dissolve at least 25–30 percent by weight of the polymer. On the other hand, the temperature must be sufficiently low to avoid thermal destruction of the formed polymer and the particular catalyst employed. Thus the solvent employed must be chosen with regard to the silylchromate catalyst selected in order that the temperature requirements for adequate solvation and catalyst existence are not exceeded. In general, for the various solvents and silylchromate catalyst used, temperatures within the range of about 100° C. to about 200° C., and preferably about 130° C. to about 170° C., have been found to be generally optimum for the practice of such solution polymerization. However, the particular polymer being produced also has a significant effect on the optimum temperature. For example, ethylene-propylene copolymers produced by this process are soluble in many of these organic solvents at low temperatures and hence the use of such temperatures is permissible in this invention even though such temperatures may not be desired or optimum for producing polyethylene or other olefin homopolymers or copolymers.

Solvents constitute one of the most significant and vexing sources of catalyst poisoning. Moreover, in prior solution polymerization processes employing transition metal-containing catalysts, the use of large quantities of solvent, i.e., a solvent-to-polymer ratio of the order of 20:1, was believed necessary. Such large proportions of solvent necessarily greatly increased the catalyst poisoning problem. In the present process, however, the proportion of solvent to polymer can be as low as 1:1 or even less, thereby maintaining very high catalyst productivity and efficiency of the system.

When the solvent serves as the principal reaction medium, it is of course desirable to maintain the solvent medium substantially anhydrous and free of any possible catalyst poisons, by redistilling or otherwise purifying the solvent before use in this process. Treatment with an absorbent such as high surface area silicas, aluminas, molecular sieves and like materials are beneficial in removing trace amounts of contaminants that may reduce the polymerization rate or poison the catalyst during reaction.

However, it is also possible to operate the polymerization reaction without an added solvent reaction medium, if desired. For example, the liquid monomer itself can be the reaction medium, either with the normally liquid monomers as in making ethylene-propylene copolymers using liquefied propylene and other similar normally liquid monomers or by operating under sufficient pressure that a normally gaseous monomer is liquefied.

The fact that polymerization rate remains high even at the high viscosities encountered at high solids level, is unexpected. It is particularly surprising and unexpected that the reaction rate remains high when gaseous monomers such as ethylene and propylene are employed. We have found, however, that high polymerization rates are maintained even when using these gaseous monomers at pressures under 100 p.s.i.g. when the reaction solution is agitated by means of a high velocity, high shear stirrer, particularly one driven at speeds in excess of 2000 r.p.m. and designed to impart considerable shearing action on the solution.

Another particularly important advantage afforded by the present process is that the high solids content polymer solution upon completion of the polymerization reaction is, without any further treatment, suitable for polymer isolation by milling techniques, such as those described in U.S. 2,434,707 to W. A. Marshall. The "Marshall mill" is operated most advantageously with the polymer-solvent mixture being treated is high in polymer content. The use of such an enclosed mill also permits the recycle of all or part of the separated solvent to the polymerization reactor without contact with oxygen or atmospheric water vapor which are destructive of many transition metal-containing catalysts.

Still another advantage of the present process is provided by maintaining the catalyst and the polymer, as formed, in homogeneous solution in the solvent medium. By avoiding the formation of a polymer suspension, the reaction mass behaves surprisingly as a viscous fluid which can be pumped and handled by any of the standard techniques for handling fluids.

Still another advantage of having the polymer soluble in the diluent is that high reaction temperatures can be employed. This is advantageous because the high temperatures reduce the viscosity of the solution, they also cause the polymerization to proceed faster, and allow more efficient removal of the heat of reaction because of the large temperature differential between the reactor and the cooling water, and also permit control of the polymer molecular weight since high reaction temperatures generally cause the formation of lower molecular weight polymer. This latter factor is particularly important in the production of waxes of high melt index as is demonstrated hereafter in the appended examples.

The separation of polymer from the solvent medium is not limited in this invention to the use of a Marshall mill, although a Marshall mill has been found to be well suited for use herein and is preferred. However, it is also possible to employ precipitation and filtration techniques to recover the polymer, or to concentrate the polymer/solvent mass by flash evaporation or other means of solvent removal followed by high shear milling. A number of other suitable high shear mills are commercially available and, because of the low solvent content of the solution to be treated, other devices such as vented extruders, calendering roll mills, planetary rotor mills such as the one described in U.S. 3,075,747 to W. L. Calvert, Banbury mills, and the like, can also be successfully employed to accomplish isolation of the polymer product. By the term "high shear mill" as used hereinafter is meant a mill comprising parallel rolls having intermeshing threads, and the term "high shear conditions" and "conditions of high shear" mean those conditions achieved on a high shear mill or by adequately powered high speed mixers for viscous materials.

It should be understood that the high solids system can be employed with the catalyst dissolved in the solvent or in solid condition as finely divided particles or deposited or absorbed on a support as hereinbefore set forth, provided that the necessary conditions of agitation, pressure, temperature, and the like are maintained so to provide contact of the monomer with the catalyst, and that the pressure and temperature are such as to initiate the polymerization of that monomer to the polymer.

It should also be understood that the invention herein contemplated, includes the techniques of fluidizing the solid catalyst bed in a gaseous system and contacting it with a gaseous olefin feed thereby eliminating the use of liquid solvents and the attendant problems of solvent separation and catalyst poisons as hereinbefore mentioned.

The amount or concentration of silylchromate employed in this invention is not critical and primarily only affects the rate and yield of polymer secured. It can be varied from about 1 to 25,000 parts per million based on the weight of olefin charged. Preferably and for greatest economy of operation, the concentration is maintained from about 5 to 100 parts per million. Obviously, the lower the impurity level in the reaction system, the lower the catalyst concentration that can be used.

In our experience with supported catalysts, yields greater than fifty thousand parts of polymer per part of silylchromate can be secured. We prefer the support to be 10 to 100 times the weight amount of the silylchromate catalyst. However, the ratio is not critical and can be widely varied.

Among the monoolefins which can be polymerized with ethylene are those containing from 2 to about 10 carbon atoms. Illustrative thereof but not limiting are ethylene, propylene, butene-1, pentene-1, 3-methylbutene-1, hexene-1, 4-methylpentene-1, 3-ethylbutene-1, heptene-1, octene-1, decene-1, 4,4-dimethylpentene-1, 4,4-diethylhexene-1, 3,4-dimethylhexene-1, 4-butyl-1-octene, 5-ethyl-1-decene, and the like. Such compounds can be polymerized in combination to yield copolymers of two or more comonomers. The monoolefins can also be copolymerized to yield copolymers with diolefins such as butadiene, dicyclopentadiene, and the like diolefins and thus secure cross-linkable unsaturated copolymers. Polyethylene is the particularly preferred homopolymer. Preferred copolymers are those containing a major proportion of interpolymerized ethylene, propylene or butene along with a minor proportion of any other monomer copolymerizable therewith. The particularly preferred copolymers are ethylene-propylene or ethylene-butene copolymers having up to 50 weight percent of the interpolymerized propylene or butene.

In this system, the $\alpha$-olefins in combination with ethylene appear to serve as chain transfer agents and serve effectively in a measure of control over molecular weight. Thus it has been noted that the polymers containing the higher amounts of $\alpha$-olefin polymerized therein are characterized by somewhat higher melt indices. Consequently, the technique can be used to prepare copolymers of almost any desired melt index.

Also serving in what appears to be a capacity as a chain transfer agent is hydrogen added along with the olefin monomer. While the presence of hydrogen is not necessary or critical in this invention, it does provide another technique for the control of molecular weight of the polymers produced, with the greatest increase in the melt indices noted with the greatest amount of hydrogen added to the system. Furthermore, the addition of hydrogen to the system appears to narrow the molecular weight distribution of the polymer, which is desirable for some end-uses. In most cases adequate control of the melt index can be achieved without the use of hydrogen by the procedures mentioned herein; however, its use is often desired for its effect on the molecular weight distribution. Molar ratios, as desired, can vary anywhere from 0.001 up to about 10 or more moles of hydrogen per mole of olefin and still secure highly useful solid polymers. Preferably we use up to about 0.01–0.5 mole of hydrogen per mole of olefin for control of molecular weight distribution and melt index, although greater amounts may be preferred to obtain specifically desired results, as for instance as is demonstrated in the appended examples.

The following examples will illustrate this invention but are not to be considered as limiting it in any way. They are offered to illustrate the several embodiments of this invention and a convenient way of conducting the polymerization. However, as set forth hereinbefore, there are numerous variations in the process to secure results as may be desired within this invention. Unless otherwise stated all parts and percentages are by weight. The melt index of the resin (MI) was measured by ASTM Test Method D–1238–62T and the High Load Melt Index (HLMI) was determined by the same test but with 440 p.s.i. load on the ram of the melt indexer instead of 44 p.s.i. (1–P) pressure as required by the standard test.

CONTROL

Into a stirred, one liter autoclave, continuously purged with nitrogen, were placed 500 ml. of dry n-hexane and 0.4 g. of microspheroidal intermediate density silica which was previously dried by being fluidized in nitrogen at 200° C. for at least 2 hours. Bis-triphenylsilylchromate (10 mg.) was then added, and the reactor contents were stirred for 15 minutes. At the end of this period 0.2 mmol. of triethylaluminum was introduced. The reactor was then sealed, and the nitrogen purge was discontinued. Next the reactor was heated to 88° C. and then pressurized with 400 p.s.i.g. of ethylene and ethylene was fed on demand to maintain this pressure. By external cooling the polymerization temperature was maintained at about 95° C. for 2 hours. At the end of this period, the ethylene feed was discontinued, the reactor was cooled to 70° C., vented, and dismantled. The yield of white, particulate polyethylene was 134 grams (MI—1P=0.008, HLMI=2.9).

Example 1

When diethylaluminum ethoxide was added to the catalyst in addition to triethylaluminum, the melt index of the resulting polymer was substantially increased as shown by the data of the following Table I. In these experiments, the ethoxide was added to the catalyst approximately one minute prior to the addition of aluminum triethyl, while otherwise following the procedure of the control. In the second group of experiments, the same procedure was followed but using 600 p.s.i. ethylene pressure and an intermediate density silica instead of the microspheroidal silica and in the last two experiments the reaction time was 1¾ hours and 1½ hours respectively. As shown in Table I, the column DAE is the millimoles of diethyl aluminum alkoxide, TEA is the millimoles of triethyl aluminum and the mole ratio is of ethoxide to triethyl.

TABLE I

| DAE | TEA | Mole Ratio | Reaction Temp. (° C.) | Yield (g.) | Melt Index | |
|---|---|---|---|---|---|---|
| | | | | | 1P | HLMI |
| None | 0.26 | Control | 95 | 134 | 0.008 | 2.9 |
| 0.05 | 0.20 | 0.25 | 95 | 130 | 0.02 | 5.0 |
| 0.13 | 0.079 | 1.65 | 92 | 122 | 0.21 | 17.0 |
| 0.16 | 0.065 | 2.5 | 92 | 130 | 0.40 | 32.1 |
| 0.19 | 0.072 | 2.6 | 94 | 133 | 0.34 | 24.2 |
| 0.21 | 0.058 | 3.6 | 90 | 140 | 0.32 | 26.3 |
| 0.25 | 0.055 | 4.5 | 90 | 120 | 0.30 | 23.4 |
| 0.27 | 0.039 | 7.0 | 91 | 196 | 0.29 | 20.9 |
| None | 0.18 | Control | 98 | 240 | 0.006 | 1.4 |
| 0.018 | 0.18 | 0.1 | 98 | 282 | 0.06 | 9.2 |
| 0.18 | 0.18 | 1.0 | 98 | 243 | 0.18 | 18.0 |
| 0.18 | 0.09 | 2.0 | 98 | 248 | 0.56 | 59 |
| 0.18 | 0.09 | 2.0 | 98 | 192 | 0.57 | 48 |

Example 2

The same procedure as in the Control above was followed but in place of triethylaluminum, 0.1 mmol of diethylaluminum methoxide and 0.2 mmol of triethylaluminum was used. The reaction yielded 141 grams of polyethylene (MI=0.054; HLMI=7.8).

Example 3

The same procedure as in the Control was employed but in place of triethylaluminum, 0.2 mmol diethylaluminum phenoxide and 0.1 mmol of triethylaluminum was added. A yield of 134 grams of polyethylene (MI=0.54 and HLMI=51.6) was obtained.

Example 4

The same procedure as in the Control was followed but in place of triethylaluminum, 0.2 mmol of diethylaluminum ethoxide alone was used. In 1½ hours reaction time 195 grams of polyethylene (MI=0.18; HLMI=14.2) was obtained. The polymer had a more narrow molecular weight distribution.

Example 5

The same procedure as in Example 4 was employed. In place of bis-triphenylsilylchromate, 10 mg. of bis-trimethylsilylchromate was used with 0.3 mmol of diethylaluminum ethoxide. In one hour of polymerization time at 90–92° C., 85 grams of polyethylene (MI=0.22; HLMI=16) was obtained.

Example 6

The same procedure as in Example 4 was used. In place of bis-triphenylsilylchromate, 10 mg. of polydiphenylsilylchromate was employed with 0.2 mmol of diethylaluminum ethoxide. In two hours of polymerization time at 90° C., 117 grams of polyethylene (MI=0.16; HLMI=11.7) was obtained.

Example 7

The same procedure as in the Control was employed, but in place of triethylaluminum, 0.1 mmol of diethoxyaluminumethyl and 0.1 mmol triethylaluminum was used. The yield of polyethylene was 30 grams (MI=0.30; HLMI=24.0).

Example 8

The same procedure as in the Control was followed. In place of triethylaluminum 0.4 mmol of diethylzinc was added. The polyethylene yield was 29 grams (MI=no flow; HLMI=0.56). When the alkyl consisted of 0.2 millimole of diethylaluminum ethoxide and 0.2 millimole of diethyl zinc, the yield was 70 grams of polyethylene (MI=0.096; HLMI=13.3).

Example 9

The procedure of the Control was followed but using 0.24 millimole of trisobutyl aluminum as the control instead of triethylaluminum. The yield of polyethylene was 151 grams (MI=0.02; HLMI=3.7). When the promoter consisted of 0.16 millimole of diisobutylaluminum isobutoxide with 0.14 millimole of triisobutyl aluminum, the yield was 160 grams of polyethylene (MI=0.097; HLMI=14.8).

Example 10

In a series of experiments to evaluate the effect of the alkoxide groups, various cocatalysts (0.18 mmol) were run with bistriphenylsilyl chromate in 500 ml. dry n-hexane as described in the control above, using the same 10 mg. bis-triphenylsilyl chromate supported on the 0.4 gram microspheroidal intermediate density silica activated at 200° C. Ethylene pressure of 300 p.s.i.g. was used for all runs. The alkoxides had the formula $(C_2H_5)_2AlOR$ where R was varied as indicated by reaction of the corresponding alcohol with aluminum triethyl.

TABLE II.—INFLUENCE OF VARIOUS ALKOXIDE COCATALYSTS

| R Cocatalyst | T, °C. | Yield, g./hr. | Melt Index | | [η] | Percent Soluble Cyclohexane at 80° C. |
|---|---|---|---|---|---|---|
| | | | 1P | 10P | | |
| $CH_3$ | 89 | 181/1.5 | .08 | 9.3 | 3.5 | 3.8 |
| $C_2H_5$ | 90 | 195/1.5 | .18 | 14.2 | 3.0 | 3.7 |
| $C_3H_7$ | 91 | 136/1.0 | .13 | 9.1 | 3.0 | 3.8 |
| $C_4H_9$ | 91 | 140/1.0 | .11 | 11.1 | 3.4 | 3.2 |
| $C_6H_{13}$ | 90 | 134/1.0 | .06 | 8.0 | 3.4 | 3.0 |
| Iso-propyl | 89 | 179/1.5 | .09 | 6.4 | 3.7 | 2.6 |
| Iso-butyl | 90 | 110/1.0 | .18 | 15.9 | 3.0 | 3.6 |
| Iso-amyl | 90 | 128/1.0 | .02 | 3.7 | 4.3 | 4.0 |
| Tert-butyl | 90 | 116/1.5 | .10 | 14.6 | 3.4 | 5.7 |
|  | 90 | 139/1.0 | .04 | 4.4 | 4.2 | 3.2 |
| $CH_2$— | 90 | 121/1.0 | .03 | 5.1 | 4.2 | 3.9 |
| Phenyl | 91 | 120/1.0 | 1.57 | 102.0 | 1.8 | 9.0 |
| $CH_2$— | 89 | 50/1.5 | .02 | 3.7 | 4.5 | 4.0 |
| $CH_2CH_2$— | 88 | 88/1.5 | .007 | 3.6 | 5.6 | 5. |
| (β) Naphthyl | 90 | 115/1.0 | .14 | 15.2 | 3.2 | 11.1 |
| $CH_2C(CH_3)_3$ | 90 | 128/1.0 | 0.04 | 8.3 | 4.2 | 4.5 |
| 2-ethyl hexyl | 90 | 147/1.5 | 0.07 | 8.9 | | 3.2 |
| Iso-octyl | 90 | 117/1.0 | 0.15 | 12.2 | | |
| Pinylmethyl | 90 | 141/1.0 | 0.03 | 4.2 | | 3.8 |
| Norbornylmethyl | 90 | 118/1.0 | 0.03 | 4.0 | | 5.9 |

Example 11

In a series of experiments with various catalyst supports, variation is noted with different supports in both yield and ultimate melt index of polymer obtained. Employing the technique as described in the Control above using a 1/1 ratio of $EtOAlEt_2$ to $Et_3Al$ at 88–95° C. and 300 p.s.i.g. ethylene, yields varying from 17 to 181 grams of polymer were secured.

TABLE III

| Support | Yield (gms./hrs.) | Melt Index | |
|---|---|---|---|
| | | MI | HLMI |
| Microspheroidal intermediate density silica | 181/2 | .23 | 21.5 |
| Intermediate density silica | 180/2 | .17 | 17.2 |
| Cab-O-Sil silica (non-porous) | 51/2 | .02 | 3.6 |
| G-968 silica | 171/2 | .01 | 1.5 |
| G-966 silica-alumina | 59/1.5 | .00 | .36 |
| G-966 silica-alumina [1] | 17/2 | .00 | .11 |

[1] $AlEt_3$ used alone as a control.

Example 12

Using hydrogen as a chain transfer agent for further control and adjustment of molecular weight, a series of experiments were conducted with a mixed catalyst system of equimolar amounts of triethyl aluminum and diethylaluminum ethoxide supported on a microspheroidal intermediate density silica at about 90° C. in hexane in the same manner as the Control example above with ethylene at pressures of 300 p.s.i. and the pressure of hydrogen as indicated in Table IV.

TABLE IV

| $H_2$ Press (p.s.i.) | Yield, gms./hrs. | Melt Index | |
|---|---|---|---|
| | | MI | HLMI |
| 0 | 181/2 | 0.23 | 21.5 |
| 10 | 198/2 | 1.94 | 143 |
| 25 | 173/2 | 4.35 | 298 |
| 50 | 174/2 | 6.66 | 371 |

As discussed hereinbefore, ethylene can be copolymerized in the process of the present invention with other α-olefins containing olefinic unsaturation as for example propylene, 1-butene, hexene, neohexene, styrene, and similar groups containing the unsaturated $>C=C<$ group, including conjugated and nonconjugated dienes.

Examples 13 and 14

For all copolymerization experiments a 1-l. stirred reactor was used. In the usual procedure 500 ml. of dry hexane was introduced into the reactor maintained under a nitrogen atmosphere. The support (0.5 g.) was then added to the reaction; next bis-triphenylsilyl chromate (0.010 g.) was introduced and the mixture was stirred at room temperature for 15 minutes and the reducing agents, $EtOAlEt_2$—$Et_3Al$, were then added (0.3 millimole). The system was sealed and a given amount of α-olefin was fed into the reactor. The reactor was then warmed up to the desired polymerization temperature (15 mins.) and pressurized with 400 p.s.i. of ethylene. The pressure of ethylene was kept constant by additional feed throughout the polymerization.

To test if any α-olefin homopolymerization took place, the ethylene copolymers prepared were extracted with boiling diethyl ether for 5 hours which dissolves amorphous homopolymers. The small amount of extracts obtained did not show the infrared absorptions characteristic of amorphous polymers; therefore, it is concluded that homopolymerization is negligible.

All the copolymers shown in Example 12 (Table V) and Example 13 (Table VI) below have densities varying from 0.938 to 0.956 and were produced with various catalyst supports. In Table V, the effect of the catalyst support was determined for four different silica supports heretofore described. In Table VI, the effect of support activation temperature is illustrated.

Stress crack resistance of these copolymers is superior to that of copolymers produced by other catalytic systems, $F_{50}$ values, i.e., the time required for 50% failure in Igepal, of 300–500 hours for polymer of 0.1–0.2 melt index were obtained.

TABLE V.—EFFECT OF THE SUPPORT

[5.7% of α-olefin; mole ratio $EtOAlEt_2$:$Et_3Al$=2; T=82° C.]

| Support | Yield (g./hrs.) | Melt Index | |
|---|---|---|---|
| | | 1P | 10P |
| Butene-1 copolymerization: | | | |
| MSID | 219/2 | 0.70 | 72.0 |
| ID | 186/2 | 0.40 | 42.0 |
| G-968 | 212/2 | 0.47 | 66.1 |
| G-966 | 61/2 | 0.60 | 21.0 |
| Propylene copolymerization: | | | |
| MSID | 231/2 | 1.35 | 93.7 |
| G-968 | 202/2 | 0.58 | 50.3 |
| G-966 | 97/2 | 0.09 | 12.6 |

TABLE VI.—EFFECT OF THE TEMPERATURE OF THE SUPPORT ACTIVATION

[8.3 wt. percent butene-1; mole ratio $EtOAlEt_2$:$Et_3Al$=2, total of 0.3 mmol.; T of polymerization=70° C.]

| Support | T. of Act., ° C. | Yield (g./hrs.) | Melt Index | |
|---|---|---|---|---|
| | | | 1P | 10P |
| MSID | 200 | 265/2 | 0.37 | 33.2 |
| MSID | 480 | 196/2 | 0.33 | 19.8 |
| MSID | 630 | 63/2 | 0.24 | 30.0 |
| G-968 | 200 | 203/2 | 0.16 | 23.5 |
| G-968 | 360 | 165/2 | 0.05 | 11.2 |
| G-968 [1] | 444 | 112/2 | 0.06 | 16.2 |
| G-968 | 630 | 48/2 | 0.02 | 3.2 |

[1] No $Et_3Al$, 0.25 mmol of $EtOAlEt_2$ used alone.

Example 15

The same procedure as in Examples 13 and 14 was employed. The catalyst was composed of 0.5 gram of MSID silica (dried at 200° C.), 10 mg. of bis-triphenylsilylchromate, 0.1 mmol of diethylaluminum ethoxide, and 0.92 mmol of triethylaluminum. In place of propylene, 20 grams of butadiene was fed into the reactor. In one hour polymerization time at 85° C., 23 grams of copolymer (MI=0.023, HLMI=9.0) was obtained. The copolymer contained about 2.5 percent combined butadiene as determined by residual unsaturation in the polymer, making it readily cross-linkable by free radical catalysts, and/or sulfur compounds.

Example 16

Using the same procedure as the Control above, but instead of triethylaluminum alone, there was added 0.30 mmol diethylaluminum ethoxide and 0.068 mmol triethylaluminum followed by 2.5 ml. dicyclopentadiene. In 1.5 hours at 86° C., there was obtained 23 grams of a copolymer containing 1.8% combined dicyclopentadiene as determined by measurement of the 10.58µ band in an infrared spectrum.

Example 17

To prepare the catalyst, a 200 ml. bottle was charged with 100 ml. of dry n-hexane, 0.200 g. of bis-triphenylsilyl chromate, and 8.2 g. of G-968 silica, which had been dried at 520° C. The bottle was sealed under a nitrogen atmosphere and the contents stirred for 1 hr. to complete adsorption of the chromate onto the silica. At the end of this time, 5 millimoles of diethyl aluminum cyclohexylmethoxide cocatalyst was added to complete the catalyst preparation.

A 5-gal. steel autoclave was charged with 6.5 kg. of n-hexane which had been previously purified and degassed to remove air. The autoclave was purged with nitrogen and heated to 85° C. Propylene was then added to bring the pressure to 70 p.s.i.g. and then ethylene was added to bring the total pressure to 135 p.s.i.g. At this point, the catalyst slurry prepared above was added to the reactor through a pressure lock and ethylene was added to bring the total pressure to 200 p.s.i.g. Ethylene was then fed on demand at a reaction temperature of 90° C. to maintain this pressure for 3.75 hours, at which time the polymer was discharged from the reactor and dried. The yield was 1957 g. of ethylene-propylene copolymer containing 12% propylene, Melt Index 2.3, High Load Melt Index 190.7.

*Example 18*

The catalyst was prepared as in the preceding example from 4.0 g. of microspheroidal intermediate density silica, 0.1 g. bis-triphenylsilyl chromate and 2.5 millimoles of diethyl aluminum cyclohexylmethoxide. The 5-gel reactor was charged with 6.5 kg. of n-hexane, degassed to remove air, and treated with 0.7 millimole of triethyl aluminum to scavenge residual impurities. The reactor was heated to 85° C., charged with 50 p.s.i.g. of hydrogen, the preformed catalyst was added, and ethylene added to 300 p.s.i.g. The temperature quickly rose to 96–98° C. and was maintained at that point, with cooling, throughout the run. Ethylene was added on demand to maintain 300 p.s.i.g. At the end of 3.25 hrs., the white, particulate polymer was removed from the reactor and dried. The yield was 5264 g., Melt Index 0.18, High Load Melt Index 21.6.

Without any catalyst removal step, the residual chromium in this sample is less than 2 parts per million.

As has been demonstrated with homopolymerization, the variation in the amount of the alkoxide present not only changes the yield but also the melt index of the resulting copolymer, as is demonstrated in the following series of experiments wherein the molar ratio of the alkoxide is varied from 0.5 to 6 moles per mole of aluminum alkyl. The effect on yield and melt index is readily observed, with best yields and highest melt index secured with the experiment wherein only the diethylaluminum ethoxide is employed.

In these experiments reported in Table VII, the butene copolymerization was with the bis-triphenylsilyl chromate (0.01 gm.) supported on a G–968 silica whereas with propylene, the same catalyst was supported on a MSID silica.

TABLE VII.—EFFECT OF EtOAlEt$_2$:Et$_3$Al

[5.7 wt. percent α-Olefin; T of Polymerization=80° C.; EtOAlEt$_2$+Et$_3$Al=0.3 mmol.]

| | Mole Ratio EtOAlEt$_2$:Et$_3$Al | Yield (g./hrs.) | Melt Index | |
|---|---|---|---|---|
| | | | 1P | 10P |
| Butene-1 copolymerization. | 0.5 | 116/2 | 0.19 | 31.2 |
| | 2.0 | 212/2 | 0.47 | 66.1 |
| | 6.0 | 252/2 | 1.2 | 179.0 |
| | (1) | 234/2 | 1.4 | 120.0 |
| Propylene copolymerization. | 0.5 | 157/2 | 0.76 | 66.7 |
| | 2.0 | 231/2 | 1.35 | 93.7 |
| | 4.0 | 194/1 | 1.05 | 80.8 |
| | (1) | 272/2 | 0.76 | 60.0 |

[1] EtOAlEt$_2$ only.

Use of triisobutyl aluminum and diisobutyl aluminum alkoxides cause a surprising increase in copolymer melt index when used together or when the diisobutyl aluminum alkoxide is used with diethyl aluminum alkoxides or triethyl aluminum compounds that is not observed when using such mixtures in ethylene homopolymerization. Productivity on the other hand is not significantly changed.

Conjugated or non-conjugated diolefins having up to about eight carbon atoms are easily copolymerized with the monoolefins in this invention as demonstrated in Examples 15 and 16.

By selection of the reaction temperature chain transfer modification, comonomer and/or cocatalyst combination, products of almost any desired melt index can be prepared herein. They may vary from the hard tough resins of a melt index below 0.1 to crystalline hard tough waves of melt indices of 3000 or more and high density are possible as demonstrated in the following examples.

*Example 19*

A 5 gal. pressure autoclave was charged with 7.0 kg. dry n-hexane and heated to 170° C. To the solvent there was added (under pressure) a premixed catalyst consisting of 100 ml. n-hexane, 0.2 g. bis-triphenylsilylchromate, 9.8 g. MSID SiO$_2$ (previously dried at 200° C.), 3.6 mmole diethylaluminum ethoxide and 0.34 mmole triethyl aluminum combined in that order. Hydrogen was then added to the reactor (P=100 p.s.i.g.), followed by ethylene to 500 p.s.i.g. The polymerization was conducted at this pressure and at 170° C. for 4.75 hours, after which the polymer solution was discharged from the reactor. When free from solvent, 1250 g. of wax having a melt index over 3000 and an intrinsic viscosity in Decalin at 130° C. of 0.37 was obtained. The percent vinyl was 0.54.

*Example 20*

In a pair of matched runs conducted in 500 cc. hexane in a laboratory reactor using 0.4 gram MSID silica and 0.01 gram of bis-triphenylsilylchromate. The effect of hydrogen and the aluminum cocatalysts is compared below on making intermediate melt index waxes.

TABLE VII(a)

| Cocatalyst | T, ° C. | Yield, g./hr. | H$_2$, p.s.i.g. | Total, p.s.i.g. | [η] | Wax, MI | Percent Vinyl |
|---|---|---|---|---|---|---|---|
| EtOAlEt$_2$, .18 mmole and Et$_2$Al, .06 mmole | 154 | 84/1.0 | 0 | 500 | 0.8 | 160 | .46 |
| EtOAlEt$_2$, 0.18 mmole alone | 162 | 94/1.0 | 50 | 500 | | 1,000 | .71 |

*Example 21*

Conducted in a similar manner but in large equipment, three additional runs were made in like manner but keeping the cocatalyst constant at 3.6 mmole EtOAlEt$_2$ and 0.34 mmole Et$_3$Al in a 5 gallon reactor in 10,000 cc. hexane using about 9.5 grams of MSID silica containing 0.2 gram of triphenylsilyl chromate at a uniform reaction temperature of 170° C.

TABLE VIII(b)

| Yield, gms./hr. | H$_2$ pressure, p.s.i.g. | Total pressure, p.s.i.g. | (η) | Melt Index | Percent Vinyl |
|---|---|---|---|---|---|
| 1,100/4.75 | 50 | 500 | 0.5 | 1,500 | .74 |
| 1,250/4.75 | 100 | 500 | 0.37 | 3,000 | .54 |
| 1,500/4.75 | 140 | 500 | 0.49 | 4,000 | .61 |

As indicated hereinbefore, the alkoxide can be prepared in situ in the catalyst system by addition of the alkoxide forming alcohol or phenol to the silylchromate with, prior to or after the aluminum trialkyl is added for the same or similar effects as is demonstrated in the following examples.

Example 22

In a manner similar to the previous runs, three experiments were conducted in 500 cc. hexane using 0.4 gram MSID silica dried at 200° C. and 10 mg. triphenylsilyl chromate. Ethylene at a pressure of 300 p.s.i.g. was used at a polymerization temperature of 91° C. In the first run diethyl aluminum ethoxide was used alone. In the other two runs it was made in situ.

TABLE IX

| EtOAlEt$_2$, mm. | EtOH, mm. | TEA, mm. | Yield, g./hr. | Melt Index 1P | Melt Index 10P |
|---|---|---|---|---|---|
| .18 | | | 195/1.5 | .18 | 14.2 |
| | ¹.19 | .20 | 116/1.0 | .16 | 13.0 |
| | .19 | ¹.20 | 114/1.0 | .27 | 24.8 |

¹ Added first.

Example 23

The same procedure as in the Control was employed. In place of triethylaluminum, 0.19 mmole ethanol and 0.20 mmole triethylaluminum were added one shortly after the other. In 1 hour, a yield of 116 g. polyethylene was obtained (MI=0.16, HLMI=13.0).

Example 24

In the usual procedure, 500 ml. of dry hexane was introduced into a liter stirred reactor and 0.5 gm. of MSID silica added. Next 0.01 gram of bistriphenylsilylchromate was then added and the mixture stirred for 15 minutes after which the reducing agent EtOAlEt$_2$ was then added (0.3 mmole). Five cc. hexene-1 was then added to the reactor. The reactor was heated to the desired polymerization temperature and pressurized with 300 p.s.i. of ethylene. After 1.5 hours at 90–93° during which time ethylene was fed to maintain pressure, a yield of 170 g. of polymer with a melt index of 1.20 and a HLMI of 77.5 was obtained. The methyl content of the ethylene-hexene copolymer was 0.125%.

What is claimed is:

1. A process for the polymerization of ethylene which comprises contacting ethylene with a catalytic quantity of (a) a silylchromate containing the group of the formula

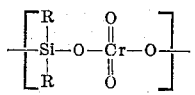

wherein R is a hydrocarbyl radical containing from 1 to about 14 carbon atoms, and (b) an organoaluminum compound having at least one and no more than two oxyhydrocarbyl groups attached to the aluminum atom.

2. A process for the polymerization of ethylene which comprises contacting ethylene with a catalytic quantity of (a) a bis-trihydrocarbylsilylchromate having the formula

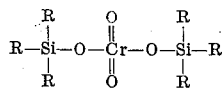

wherein R is a hydrocarbyl radical containing from 1 to about 14 carbon atoms, and (b) an organoaluminum compound represented by the formula R$_x$Al(OR)$_y$ where x and y are integers from 1 to 2 inclusive and together total 3, and R is a hydrocarbyl group containing from 1 to about 14 carbon atoms.

3. A process for the polymerization of ethylene which comprises contacting ethylene with a catalytic quantity of (a) a bis-trihydrocarbylsilylchromate of the formula

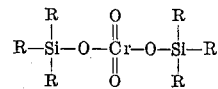

wherein R is a hydrocarbyl radical having from 1 to 14 carbon atoms, and (b) an organoaluminum compound represented by the formula R$_x$Al(OR)$_y$ where x and y are integers from 1 to 2 inclusive and together total 3, and R is a hydrocarbyl group containing from 1 to about 14 carbon atoms at a temperature from about 30° C. to 200° C. and at a pressure sufficient to initiate polymerization.

4. The method claimed in claim 3 wherein the monomer is a mixture of ethylene and an olefinically unsaturated monomer copolymerizable therewith.

5. The method claimed in claim 3 wherein the bis-trihydrocarbylsilylchromate is bis-triphenylsilylchromate.

6. The method claimed in claim 3 wherein the catalyst is bis-triphenylsilylchromate and a dialkyl aluminum alkoxide.

7. The method claimed in claim 3 wherein the catalyst is bis-triphenylsilylchromate and a diethyl aluminum alkoxide.

8. The method claimed in claim 3 wherein the bis-trihydrocarbylsilylchromate is absorbed on an insoluble, inorganic material having high surface area.

9. The method claimed in claim 8 wherein the insoluble, inorganic material is a silica having a surface area of from 50 to 1000 square meters per gram.

10. The method claimed in claim 3 wherein there is present cocatalytic amounts of an organometal compound of the formula R$_y$MeX$_z$ wherein R is hydrocarbyl group containing from 1 to 14 carbon atoms, Me is selected from the group of aluminum and zinc, X is selected from the group of hydrogen and halogen, y is an integer from 2 to 3 inclusive, and z is an integer from 0 to 1 inclusive, the sum of y and z being equal to the valence of the metal Me.

11. The method claimed in claim 3 wherein hydrogen is present in an amount from about 0.001 to 10 moles per mole of ethylene.

12. The method claimed in claim 3 wherein the polymerization is conducted in an inert organic medium for the polymerization.

13. The method claimed in claim 12 wherein the polymerization is conducted in solution at a temperature above the solution temperature of the polymer in the inert medium.

14. The method claimed in claim 12 wherein the polymerization is conducted in a slurry at a temperature below the solution temperature of the polymer in the inert medium.

15. A process for polymerization of ethylene which comprises contacting ethylene with a catalyst consisting essentially of a bis-trihydrocarbylsilylchromate having the formula

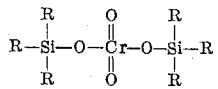

wherein R is a hydrocarbyl radical containing from 1 to about 14 carbon atoms adsorbed on an insoluble inorganic material of high surface area, and an organo-aluminum compound of the formula R$_x$Al(OR)$_y$ wherein R is a hydrocarbyl group containing from 1 to about 14 carbon atoms, x and y are integers from 1 to 2 inclusive, and together total 3, and an aluminum trialkyl of the formula AlR$_3$ wherein R is as defined above.

16. The method claimed in claim 15 wherein the monomer is a mixture of ethylene and an olefinically unsaturated monomer copolymerizable therewith.

17. The method claimed in claim 15 wherein the catalyst is a mixture of bis-triphenylsilylchromate, a diethylaluminum alkoxide, and triethylaluminum.

18. The method claimed in claim 15 wherein hydrogen is present in an amount from about 0.001 to 10 moles per mole of ethylene.

19. A process for polymerization of ethylene which comprises contacting ethylene with a catalytic quantity of a bis-trihydrocarbylsilylchromate having the formula.

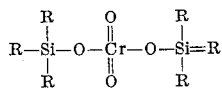

wherein R is a hydrocarbyl radical containing from 1 to about 14 carbon atoms adsorbed on an insoluble inorganic material of large surface area and a dialkylaluminum alkoxide in an inert organic medium at temperatures between 30° C. to 110° C. and at a pressure sufficient to initiate polymerization of the ethylene to high polymer, and for a time sufficient to produce polymer solids of at least 25 percent of the reaction mass, said organic medium and said temperature being selected such that the polymer solids are substantially insoluble in the organic medium at the reaction temperature.

20. The method claimed in claim 19 wherein the bis-trihydrocarbylsilylchromate is adsorbed on silica of a surface area of 50 to 1000 square meters per gram.

21. The method claimed in claim 20 wherein the bis-trihydrocarbylsilylchromate is bis-triphenylsilylchromate.

22. The method claimed in claim 21 wherein hydrogen is present in an amount from about 0.001 to 10 moles per mole of olefin.

23. The method claimed in claim 21 wherein the monomer is a mixture of ethylene and an olefinically unsaturated monomer copolymerizable therewith.

24. The method claimed in claim 23 wherein the copolymerizable monomer is propylene.

25. The method claimed in claim 23 wherein the copolymerizable monomer is butene.

26. The method claimed in claim 23 wherein the copolymerizable monomer is a diolefin.

27. A process for polymerization of ethylene which comprises contacting ethylene with a catalytic quantity of a bis-trihydrocarbylsilylchromate having the formula

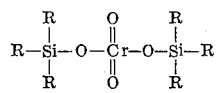

wherein R is a hydrocarbyl radical having from 1 to 14 carbon atoms adsorbed on an insoluble, inorganic material having high surface area and a dialkyl aluminum alkoxide, said inorganic material being suspended in an inert organic medium for the polymerization at a temperature between about 100° and 200° C. and at a pressure sufficient to initiate the polymerization while maintaining at least a portion of the polymer solids dissolved in the organic medium.

28. The method according to claim 27 wherein the insoluble inorganic material is silica of a surface area of 50 to 1000 square meters per gram.

29. A catalyst system for polymerization of ethylene comprising (a) a silylchromate containing the group of the formula

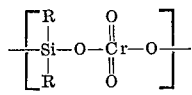

wherein R is a hydrocarbyl radical containing from 1 to about 14 carbon atoms, and (b) an organoaluminum compound having at least one and no more than two oxyhydrocarbyl groups to the aluminum atom.

30. A catalyst system for polymerization of ethylene comprising a bis-trihydrocarbylsilylchromate having the formula

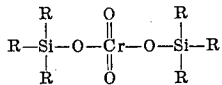

wherein R is a hydrocarbyl radical containing from 1 to about 14 carbon atoms, and (b) an organoaluminum compound represented by the formula $R_xAl(OR)_y$ where $x$ and $y$ are integers from 1 to 2 inclusive and together total 3, and R is a hydrocarbyl group containing from 1 to about 14 carbon atoms.

31. A catalyst system claimed in claim 30 wherein the bis - trihydrocarbylsilylchromate is bis - triphenylsilylchromate.

32. A catalyst system claimed in claim 30 wherein there is present an organometal compound of the formula $R_yMeX_z$ wherein R is a hydrocarbly group containing from 1 to 14 carbon atoms, Me is a metal selected from the class of aluminum and zinc, X is selected from the group of hydrogen and halogen, $y$ is an integer from 2 to 3 inclusive and $z$ is an integer from 0 to 1 inclusive, the sum of $y$ and $z$ being equal to the valence of the metal Me.

33. A catalyst system claimed in claim 30 wherein the bis-trihydrocarbylsilylchromate is adsorbed on an insoluble, inorganic material having high surface area.

34. A catalyst system claimed in claim 33 wherein the inorganic material is silica having a surface area of 50 to 1000 square meters per gram.

35. A catalyst system claimed in claim 33 wherein the bis - trihydrocarbylsilylchromate is bis - triphenylsilylchromate.

36. The catalyst system claimed in claim 35 wherein the organoaluminum compound is a dialkyl aluminum alkoxide.

37. The catalyst system claimed in claim 36 wherein the dialkyl aluminum alkoxide is a diethyl aluminum alkoxide.

38. The catalyst system claimed in claim 36 wherein the dialykyl aluminum alkoxide is a diisobutyl aluminum alkoxide.

References Cited

UNITED STATES PATENTS 2,898,328 8/1959 Reed _____ 260—93.7
2,981,725 4/1961 Luft _____ 260—93.7

FOREIGN PATENTS 875,735 8/1961 Great Britain.
649,487 12/1964 Belgium.

JOSEPH L. SCHOFER, *Primary Examiner.*

F. L. DENSON, *Assistant Examiner.*